United States Patent
Wakamatsu et al.

[11] Patent Number: 5,948,265
[45] Date of Patent: Sep. 7, 1999

[54] ION-EXCHANGER, PROCESS FOR PRODUCTION THEREOF, AND PROCESS FOR REMOVAL OF MULTIPLY CHARGED ANIONS EMPLOYING THE ION-EXCHANGER

[75] Inventors: Hidetoshi Wakamatsu; Manabu Sakurai; Tsugio Murakami; Sadakatsu Kumoi, all of Yamaguchi, Japan

[73] Assignee: Tosoh Corporation, Yamaguchi, Japan

[21] Appl. No.: 08/888,239

[22] Filed: Jul. 3, 1997

[30] Foreign Application Priority Data

Jul. 5, 1996 [JP] Japan ................................... 8-176053

[51] Int. Cl.$^6$ ................................ B01J 41/18; C02F 1/42
[52] U.S. Cl. ............................... 210/683; 502/11; 502/417
[58] Field of Search ............................... 210/502.1, 679, 210/683; 502/182, 417, 11

[56] References Cited

U.S. PATENT DOCUMENTS

| | | | |
|---|---|---|---|
| 4,474,853 | 10/1984 | Watanabe | 428/403 |
| 4,692,431 | 9/1987 | Weller | 502/417 |
| 5,210,317 | 5/1993 | Kuno et al. | 568/420 |
| 5,304,696 | 4/1994 | Khare et al. | 585/668 |

FOREIGN PATENT DOCUMENTS 0134314  3/1985  European Pat. Off. .

*Primary Examiner*—Ivars Cintins
*Attorney, Agent, or Firm*—Sughrue, Mion, Zinn, Macpeak & Seas, PLLC

[57] ABSTRACT

An ion-exchanger is provided which comprises zirconium hydroxide supported on active carbon. The process for producing the ion-exchanger, and a process for removing a multiply charged anion are also provided which employ the ion-exchanger. The ion-exchanger of the present invention has high chemical resistance, high heat resistance, high mechanical strength, and excellent ion exchange characteristics.

15 Claims, No Drawings

“ION-EXCHANGER, PROCESS FOR PRODUCTION THEREOF, AND PROCESS FOR REMOVAL OF MULTIPLY CHARGED ANIONS EMPLOYING THE ION-EXCHANGER”

BACKGROUND OF THE INVENTION

1. Field of the Invention

The present invention relates to an ion-exchanger comprising zirconium hydroxide supported on active carbon, which is useful for application fields utilizing ion exchange or ion adsorption such as separation, removal, recovery, purification, and concentration of specific ions in an aqueous solution or in an organic solvent, and removal of noxious ions from waste water. The present invention relates also to a process for producing the ion-exchanger, and process for removing a multiply charged ions employing the ion-exchanger.

2. Description of the Related Art

Ion-exchange resins are widely used as ion-exchangers. However, the ion-exchange resin is limited in the application fields thereof owing to poor resistance to radiation and heat, and poor ion selectivity in a solution containing many kinds of salts or high concentration of electrolyte.

Inorganic ion-exchangers, on the other hand, have excellent properties such as high radiation resistance, high heat stability at high temperature, and high ion selectivity, and are promising in application fields of water treatment at a high temperature, concentration and purification of a substance, and so forth. In particular, an inorganic ion-exchanger comprising zirconium hydroxide having amphoteric ion exchangeability has low solubility in water and high selectivity to specific ions, being suitable for removal and recovery of noxious substances, impurities, and the like.

However, the zirconium hydroxide having the amphoteric ion exchangeability, which is usually produced from a halide, oxyhalide, or a mineral acid salt of zirconium by contact with an alkali, is in a form of a gel or a coagulate and is difficult in industrial handling.

JP-A-60-44056, for example, discloses a process for treating a salt solution by a fixed-bed packed column system employing zirconium hydroxide supported on a cation-exchange resin having sulfonic acid functionality. In this process, although sulfate ions are selectively adsorbed and removed by zirconium hydroxide on the ion-exchange resin, the efficiency of regeneration by desorption is low, and a large amount of expensive cation-exchange resin is required for supporting the zirconium hydroxide which is uneconomic JP-A-60-168541 discloses use of a crosslinking or noncrosslinking curable organic fluoroplastic as the binder. JP-A-3-131349 and JP-A-4-45854 disclose processes employing a clay mineral and a metal alkoxide or a hydrosol as the binder. These processes have disadvantages of limitation in preparation conditions and troublesomeness in operation. When the mechanical strength of the particles is raised, the ion exchange properties such as the ion exchange capacity and the ion exchange velocity are lowered in comparison with the ones in a powdery state.

JP-A-3-153522 discloses a process for treatment of a salt solution with dry powdery zirconium hydroxide. This process employs a simple zirconium hydroxide in a slurry state as an ion-excahger. This process involves the problem that the ion-exchanger is liable to be pulverized or crushed by a stirrer or a pump to leak out of the system, or the load of a filter machine is liable to become larger. In use of an inorganic ion-exchanger in a packed column system, the fine powdery inorganic ion-exchanger should be molded into a suitable shape and size by use of a binder. However, the binders tend to be dissolved out in acidic or alkaline conditions, which limits the application fields of the ion-exchanger.

SUMMARY OF THE INVENTION

The present invention intends to provide an ion-exchanger which is excellent in chemical resistance, heat resistance, mechanical strength, and ion exchanging properties without the above disadvantages and can be produced at a low cost.

A novel ion-exchanger was found by the inventors of the present invention after comprehensive investigation. This novel ion-exchanger comprises zirconium hydroxide supported on active carbon. This novel ion-exchanger can be produced at a low cost in a simple process, and yet has a significantly large ion exchange capacity, and excellent properties of high rate of adsorption of multiply charged anions in comparison with the simple zirconium hydroxide. Further, it was found that a sulfonic acid compound supported together with the zirconium hydroxide on the active carbon improves further the ion exchange capacity and the adsorption rate. The present invention has been accomplished based on the above findings.

In an aspect of the present invention, there is provided an ion-exchanger comprising zirconium hydroxide supported on active carbon.

In another aspect of the present invention, there is provided a process for producing the ion-exchanger.

In a further aspect of the present invention, there is provided a process for removing a multiply charged anion by employing the ion-exchanger.

DETAILED DESCRIPTION OF THE PREFERRED EMBODIMENT

The present invention is described below in detail.

The zirconium hydroxide in the present invention is a generic name of the compounds including $Zr(OH)_n$, $ZrO_2 \cdot nH_2O$, $ZrO(OH)_2 \cdot nH_2O$, and the like, and is usually produced by reaction of a zirconium compound with an alkali.

The active carbon in the present invention serves as a carrier for supporting the zirconium hydroxide. Any active carbon may be used provided that it is capable of supporting the zirconium compound and the sulfonic acid compound. The active carbon may be powdery, granular, or fibriform. Furthermore, an inactive carbonaceous material such as graphite can be useful therefor. Of these, usual active carbon is preferred in consideration of the supporting amount of the zirconium compound and the sulfonic acid compound. Granular active carbon is more preferred in consideration of ease of production, filling operation into a packed column, liquid flow operation, and price. The source material of the active carbon includes various materials such as coconut shell, coal, wood, peat, lignite, and pitch.

The granular active carbon employed has a particle size suitable for the operation of packing into a column or the like, and stirring. The particle size is not especially limited, but is selected so as to achieve the object of the present invention. The average particle diameter thereof ranges preferably from 0.1 to 30 mm, more preferably from 0.3 to 10 mm, still more preferably from 0.5 to 5 mm. The active carbon may be classified by size by use of a sieve, if necessary.

The shape of the particle of the active carbon is selected in consideration of ease of the handling such as packing into a column, and stirring. The particle may be in any shape, including shaped coal in a sphere or pellet shape and crushed coal.

The active carbon is preferably porous for a larger amount and a higher efficiency of supporting the zirconium hydroxide and the sulfonic acid compound. The surface of the active carbon has preferably a larger pore volume and a higher specific surface area for a larger amount and a higher efficiency of supporting the zirconium hydroxide and the sulfonic acid compound. The pore volume ranges preferably from 0.5 to 1.4 $cm^3/g$, more preferably from 0.7 to 1.1 $cm^3/g$. The specific surface area ranges preferably from 700 to 1600 $m^2/\mu g$.

The starting material for the zirconium hydroxide to be supported on the active carbon is not especially limited provided that it is capable of forming zirconium hydroxide by contact with an alkali, in the present invention. The starting material is exemplified by halogenated zirconium such as zirconium oxychloride, and zirconium tetrachloride; mineral acid salts of zirconium such as zirconium sulfate, and zirconium nitrate; and hydrates thereof. Of these compounds, zirconium oxychloride and zirconium sulfate are preferred in view of the cost.

The sulfonic acid compound, which is deposited on the active carbon for increasing the amount of the supported zirconium hydroxide on the active carbon, may be derived from any compound having a sulfonic group in the molecule. The sulfonic acid group-containing compound as the starting material includes aromatic sulfonic acids such as o-toluenesulfonic acid, m-toluenesulfonic acid, p-toluenesulfonic acid, o-styrenesulfonic acid, m-styrenesulfonic acid, p-styrenesulfonic acid, o-benzenesulfonic acid, m-benzenesulfonic acid, p-benzenesulfonic acid, o-phenolsulfonic acid, m-phenolsulfonic acid, p-phenolsulfonic acid, o-dodecylbenzenesulfonic acid, m-dodecylbenzenesulfonic acid, p-dodecylbenzenesulfonic acid, o-benzenedisulfonic acid, m-benzenedisulfonic acid, and p-benzenedisulfonic acid, and salts or the like compounds thereof; and aliphatic sulfonic compounds such as chloroethanesulfonic acid, and pentanesulfonic acid, and salts thereof. The metals for the salt formation include alkali metals such as Li, Na, and K; and alkaline earth metals such as Mg, and Ca. Of these, preferred are aromatic sulfonic compound, including o-toluenesulfonic acid, m-toluenesulfonic acid, p-toluenesulfonic acid, o-benzenesulfonic acid, m-benzenesulfonic acid, p-benzenesulfonic acid, o-phenolsulfonic acid, m-phenolsulfonic acid, p-phenolsulfonic acid, o-styrenesulfonic acid, m-styrenesulfonic acid, and p-styrenesulfonic acid, and salts thereof. Of these, p-toluenesulfonic acid and the salts thereof are particularly preferred.

The sulfonic acid compound supported on the active carbon improves the dispersibility of the zirconium compound in impregnation into the active carbon, giving a larger exchange capacity of the resulting ion-exchanger having the supported zirconium hydroxide.

The solvent employed for the impregnation mav be either a usual organic solvent, or water. Water is preferred for simplification of the process and ease of production.

The process of production of the ion-exchanger of the present invention is not limited, provided that the zirconium compound is impregnated into the active carbon in the production process. For example, active carbon is immersed in a solution containing a starting material for a prescribed time to impregnate the zirconium compound sufficiently into the active carbon. The time for the impregnation depends on the conditions such as the temperature. Usually about one hour immersion is sufficient, a longer time being acceptable. The impregnation can be conducted by immersion with stirring or vibration, or liquid flow through a packed column, but is not especially limited thereto provided that the impregnation process does not cause crushing of the active carbon. After the impregnation of the zirconium compound solution into the active carbon, the active carbon may be directly brought into contact with an alkali, or the active carbon impregnated with the zirconium compound may be isolated by filtration. The separation may be conducted by a usual method such as sedimentation, vacuum filtration, and centrifugal filtration, and the separation method is not especially limited. Preferably the obtained active carbon impregnated with the zirconium compound is dried once to prevent falling-off of the supported zirconium hydroxide formed on contact with the alkali. The drying of the active carbon is conducted preferably at a temperature at which the starting zirconium compound is not decomposed. The drying is conducted by a usual drying method such as heat drying, vacuum drying, and air-flow drying without special limitation. The amount of the supported zirconium on the active carbon can be suitably controlled by adjusting the zirconium concentration in the zirconium compound solution in the impregnation step, or by repeating the impregnation operation.

The active carbon impregnated with the zirconium compound as above is brought into contact with an alkali. Any alkali may be used therefor which is capable of converting the zirconium compound into zirconium hydroxide. The alkali includes sodium hydroxide, potassium hydroxide, calcium hydroxide, and ammonia. The alkali may be used in a solid form or in a solution state. When a solid alkali is used, a solution without alkali is preliminarily added to the active carbon and thereto the solid alkali is added. In contact of the active carbon with the alkali, the whole of the alkali may be added at one time, or may be added in portions. The amount of the alkali is selected such that the zirconium hydroxide can be formed. By the above operation, the impregnated zirconium compound is converted into zirconium hydroxide to produce an ion-exchanger comprising zirconium hydroxide supported on the active carbon. The contact with the alkali may be conducted with stirring or vibration, or by liquid flow through a packed column, but is not especially limited, provided that the active carbon is not crushed. After the contact with the alkali, the resulting ion-exchanger may be used, as it is, for ion exchange. Otherwise, the resulting ion-exchanger after the contact with the alkali may be separated from the liquid by solid-liquid separation such as sedimentation, vacuum filtration, and centrifuging filtration before use for ion exchange. The isolated ion-exchanger may further be dried by a usual drying method such as heat drying, vacuum drying, and air-flow drying before use for ion exchange.

The drying may be conducted either after immersion of the active carbon in a zirconium compound solution or after the contact with the alkali, or after each of the treatments.

The pH in the contact with the alkali is not especially limited. When the zirconium compound only is impregnated, the contact is conducted usually not lower than the pH level of 8.0, preferably at pH 12.0 or higher, more preferably in the pH range of from 12.0 to 14.0 for more supporting amount of the zirconium compound. This pH range is selected to prevent elution of the zirconium compound from the active carbon before the zirconium compound on the active carbon is converted to less soluble zirconium hydroxide. For this purpose, the amount of the added alkali should be adjusted to maintain the pH value higher than a certain level.

Impregnation of a sulfonic acid compound into the active carbon will improve the ion exchange capacity and the adsorption rate as described above. Specifically, the sulfonic acid compound solution may be impregnated into the active carbon before the impregnation of the zirconium compound solution, or a mixture of the sulfonic acid solution and the zirconium compound solution is impregnated into the active carbon. The dispersibility of the zirconium compound in the active carbon is improved in the presence of the sulfonic acid compound in the active carbon in comparison with that in the absence thereof, the ion exchange ability of the ion-exchanger being improved thereby. In other words, the sulfonic acid compound improves the dispersibility of the zirconium compound into the active carbon.

More specifically, in impregnation of the sulfonic acid compound and the zirconium compound, the active carbon is firstly immersed in a solution containing the sulfonic acid compound for a prescribed time to impregnate the sulfonic acid compound into the active carbon. The time of the impregnation depends on the conditions such as the temperature and the stirring, and usually one hour of immersion is sufficient, a longer time being acceptable. The impregnation may be conducted by immersion with stirring or vibration, or liquid flow through a packed column, but is not especially limited thereto provided that the active carbon is not crushed by the impregnation process.

After the impregnation of the sulfonic acid compound into the active carbon, a solution of the zirconium compound may directly be added thereto without isolation of the active carbon, or alternatively the active carbon impregnated with the sulfonic acid compound may be isolated once by filtration. The isolation may be conducted by a usual solid-liquid separation method such as sedimentation, vacuum filtration, and centrifugal filtration, and the filtration method is not especially limited. The obtained active carbon with the impregnated zirconium compound may be dried once.

Then, the active carbon impregnated with the sulfonic acid compound is immersed in a solution containing the zirconium compound to be sufficiently impregnated with it. The time of the impregnation depends on the conditions such as the temperature and the stirring. Usually one hour of immersion is sufficient, a longer time being acceptable. The impregnation can be conducted by immersion with stirring or vibration, or liquid flow through a packed column, but is not specially limited thereto provided that the impregnation process does not cause crushing of the active carbon.

Subsequently, the active carbon impregnated with the sulfonic acid compound and the zirconium compound is brought into contact with an alkali. The active carbon after the impregnation may directly be brought into contact with the alkali, or may be isolated by filtration before that. The isolation may be conducted by a usual method such as sedimentation, vacuum filtration, and centrifugal filtration, and the separation method is not especially limited. Preferably the resulting active carbon is dried once to raise the supporting efficiency of the sulfonic acid compound and the zirconium compound on the active carbon to prevent thereby falling-off of the supported zirconium hydroxide formed on contact in a wet state with the alkali.

The drying of the active carbon impregnated with the sulfonic acid compound and the zirconium compound is conducted preferably at a temperature at which the zirconium compound and the sulfonic acid compound as the starting materials are not denatured or decomposed, usually at a temperature ranging from 20 to 300° C. The drying is conducted by a usual drying method such as heat drying, vacuum drying, and air-flow drying without special limitation.

The amount of the supported zirconium compound, and the amount of the sulfonic acid compound for improving the dispersibility of the zirconium compound supported on the active carbon can be suitably controlled without special limitations by adjusting the concentrations of the zirconium compound and the sulfonic acid compound in the impregnation step, or by number of repetition of the impregnation operation.

The drying may be conducted after immersion of the active carbon in the zirconium compound solution or in the sulfonic acid compound solution or in a solution of the mixture of the both compounds, or after the contact with the alkali, or after the respective impregnation operations.

A method for improving the active carbon for the present invention is described below for granular active carbon.

A porous granular active carbon for use as the active carbon in the present invention is preferably pre-treated for surface oxidation such as hot-air oxidation or oxidant treatment and is subsequently treated for deaeration to make the interior of the active carbon hydrophilic for sufficient penetration of the zirconium compound solution into the interior. The deaeration treatment is not especially limited, and is conducted by a known treatment method such as boiling and vacuum heating. The resulting wet granular active carbon is immersed in a solution containing a zirconium compound for a prescribed time to impregnate sufficiently the zirconium compound into the active carbon. The necessary immersion time for the impregnation depends on the conditions such as the temperature, and usually one hour of the immersion is sufficient, a longer time being acceptable.

After the impregnation, the active carbon is collected by a usual separation method such as vacuum filtration. The obtained active carbon is dried by heating at a temperature ranging from 40 to 180° C., preferably from 40 to 110° C., for several hours to prevent the loss of the supported zirconium compound after contact with alkali.

In the alkali treatment, the active carbon having the impregnated zirconium compound is stirred in an alkali solution such as an aqueous sodium hydroxide solution. The time of stirring depends on the temperature and other conditions, but is usually in the range of from one to several hours, a longer time being acceptable. The pH for the alkali treatment is adjusted usually to be not lower than 8.0, preferably not lower than 12.0, more preferably in the range of from 12.0 to 14.0 so that the zirconium compound is prevented from coming off the active carbon and as the result the amount of the supported zirconium hydroxide in the active carbon increase.

After the alkali treatment, the active carbon is collected by a usual separation method such as vacuum filtration to obtain an ion-exchanger carrying the zirconium hydroxide.

The amount of the supported zirconium hydroxide in the ion-exchanger of the present invention depends on the treatment conditions such as the kind and volume of the active carbon, and the volume of the treating liquid. The amount of the supported zirconium hydroxide can be controlled by selecting the concentration of the zirconium compound in the impregnation treatment solution, the number of repetitions of the impregnation treatment, and so forth. At the higher concentration of the zirconium compound in the impregnation treatment and with more times of repetition of the impregnation treatment, the amount of the zirconium compound impregnated in the active carbon is larger, and the ion exchange capacity of the ion-exchanger after the alkali treatment, namely the amount of the ion adsorbed in unit weight of the active carbon, is larger.

A method for improving the active carbon for the present invention is described below for the case where a sulfonic acid compound is firstly impregnated. The active carbon is preferably pretreated for surface oxidation such as hot-air oxidation or oxidant treatment and is subsequently treated for deaeration to increase the amount of the zirconium compound supported on the active carbon. The deaeration treatment can be conducted by a known method such as boiling, and vacuum heating.

The resulting wet granular active carbon is immersed in a solution of a sulfonic acid compound such as an aqueous p-toluenesulfonic acid solution for a prescribed time to impregnate sufficiently the sulfonic acid compound into the active carbon. The necessary immersion time for the impregnation depends on the conditions such as the temperature, stirring, and the kind of the active carbon, and usually one hour of the immersion is sufficient, a longer time being acceptable. After the impregnation, the active carbon impregnated with the sulfonic acid compound is collected by a usual solid-liquid separation method such as vacuum filtration. The obtained active carbon may be dried by heating at a temperature ranging from 40 to 110° C. for several hours.

The active carbon impregnated with the sulfonic acid compound is immersed in a solution containing a zirconium compound such as an aqueous zirconium oxychloride solution for a prescribed time to impregnate sufficiently the zirconium compound into the active carbon. The necessary immersion time for the impregnation depends on the conditions such as the temperature, the stirring conditions, and the kind of the active carbon. Usually one hour of the immersion is sufficient, a longer time being acceptable.

After the impregnation of the zirconium compound, the active carbon is collected by a usual solid-liquid separation method such as vacuum filtration. The obtained wet active carbon is dried by heating at a temperature ranging from 40 to 180° C., preferably from 40 to 110° C., for several hours.

Subsequently, the active carbon is brought into contact with an alkali for the alkali treatment. In the alkali treatment, the active carbon is brought into contact with an alkali such as an aqueous sodium hydroxide solution with stirring or vibration. The time of the stirring or vibration depends on the temperature, stirring intensity, and other conditions, but is usually in the range of from one to several hours. The pH for the alkali treatment is adjusted preferably in the range of pH 3.0 to 11.0, more preferably pH of 6.0 to 10.0 so that is prevented from coming off the zirconium compound the active carbon and as the result the amount of the supported zirconium hydroxide in the active carbon increase.

After the alkali treatment, the active carbon is collected by a usual solid-liquid separation method such as vacuum filtration to obtain an ion-exchanger carrying the sulfonic acid compound and the zirconium hydroxide.

The amount of sulfonic acid compound and the zirconium hydroxide supported on the active carbon depends on the treatment conditions such as the kind and volume of the active carbon, and the volume of the treating liquid. The amounts of the supported zirconium hydroxide and the sulfonic acid compound can be controlled by selecting the concentration of the sulfonic acid compound or the zirconium compound in the impregnation treatment solution, the number of repetitions of the impregnation treatment, and so forth. For example, at the higher concentration of the zirconium compound in the impregnation treatment and with more times of repetition of the impregnation treatment, the amount of the zirconium compound impregnated in the active carbon is larger, and the ion exchange capacity of the ion-exchanger after the alkali treatment, namely the amount of the ion adsorbed in unit weight of the active carbon, is larger.

The impregnation of the sulfonic acid compound together with the zirconium hydroxide into the active carbon makes larger remarkably the ion exchange capacity for the zirconium hydroxide in comparison with that of the active carbon impregnated with zirconium hydroxide only. However, an excessive amount of impregnation of the sulfonic acid compound will decrease the amount of the impregnated zirconium hydroxide. Therefore, to control the amount of the adsorbed ions per unit weight of the active carbon within a desirable range, the amount of the impregnated sulfonic acid compound is adjusted to be in the range of preferably from 0.1 to 3 moles, more preferably from 0.2 to 2 moles, per mole of the zirconium hydroxide to be supported.

The ion-exchanger obtained as above in the present invention is useful for separation, removal, recovery, purification, concentration, and so forth of a specific multiply charged anion in an aqueous solution or an organic solvent. For example, the ion-exchanger is useful for separation, removal, or recovery of a multiply charged anion in an aqueous alkali metal chloride solution. The multiply charged anion includes anions having two or more negative charges without special limitation, exemplified by sulfate ion, carbonate ion, and phosphate ion. In a specific example, the ion-exchanger is useful, in sodium chloride electrolysis employing an ion-exchange membrane, for removing impurity sulfate ion coming from the raw material sodium chloride and remaining in a dilute brine discharged from an electrolytic cell.

The ion-exchanger of the present invention can be used in any type of process for separation, removal, purification, concentration, and so forth in which the characteristics of the ion-exchanger of the present invention can be utilized. For example, the ion-exchanger can be used in a liquid flow treatment through a packed column, and a batch treatment process in an open or closed vessel with or without stirring. Of the treatment processes, preferred are processes in which the ion-exchanger is filled in a packed column and a liquid to be treated is allowed to flow through the column. In the packed column method, the liquid to be treated may be passed only once, or repeatedly.

Specifically, in the case where sulfate ion in brine is removed by adsorption with the ion-exchanger of the present invention, a required amount of the ion-exchanger is added to the brine; an acid such as hydrochloric acid or nitric acid is further added thereto to adjust the pH in the range of from 1.5 to 5.0, preferably from 1.5 to 4.0; the ion-exchanger is brought into contact with the brine for 30 to 180 minutes, preferably for 30 to 60 minutes; and then the ion-exchanger is separated or filtered. In another method, a required amount of the ion-exchanger is packed into a column; and brine having pH adjusted to be in the range of 1.5 to 5.0, preferably 1.5 to 4.0, is allowed to flow through the column to remove the sulfate ion. Otherwise, the brine is circulated through the column by maintaining the pH of the brine in the range of 1.5 to 5.0, preferably 1.5 to 4.0. The desorption of the adsorbed sulfate ion is conducted by bringing the ion-exchanger into contact with an aqueous alkali solution such as an aqueous sodium hydroxide solution for a prescribed time, usually at a pH of from 5.0 to 12.0, preferably from 9.0 to 11.0.

The ion-exchanger of the present invention has remarkably larger ion exchange capacity than simple zirconium hydroxide, and exhibits excellent characteristics in adsorption velocity. This may be due to inhibiting formation of a polymerizate or aggregate of zirconium coumpound at the alkali treatment and as the result to have high ion exchange capacity. The presence of a sulfonic acid compound is considered to make more uniform the distribution of the zirconium compound in the active carbon. Accordingly, the ion-exchanger having zirconium hydroxide supported on the active carbon has excellent ion exchange characteristics.

The above consideration on the ion exchange characteristics does not restrict the present invention.

The present invention is described below in more detail by reference to examples without limiting the invention in any way.

[Distribution of Zirconium in Active Carbon]

The granular active carbon impregnated with zirconium hydroxide, and the granular active carbon impregnated with zirconium hydroxide and p-toluenesulfonic acid (hereinafter referred to as "p-TSA") are broken to observe the distribution of the zirconium and the p-TSA. The broken surfaces are observed by FE-SEM and EPMA (S-4500) at an accelerating current of 15 kV and an irradiation current of $2\times10^{-10}$ A. Thereby, both the zirconium hydroxide and the p-TSA were observed to be distributed uniformly into the interior of the active carbon.

[Measurement of Mechanical Strength]

The mechanical strength is represented by tolerable maximum load of the test specimen of a pelletized ion-exchanger (0.8 mm diameter×5 mm length) placed laterally against compression load applied at a constant speed at an atmosphere of room temperature and ordinary pressure by use of a Kiya digital hardness tester reffering to JIS-R-1608 regarding the test method of compression strength of fine ceramics.

EXAMPLE 1

For supporting a zirconium compound, a commercial granular active carbon (coal as a source material, trade name: GCL, Norit Co.) was employed which has an iodine absorption number of 1025 mg/g, a pore volume of 0.8 $cm^3/g$, a bulk density of 0.47 g/mL, a specific surface area of 1025 $m^2/g$, and an average particle diameter of 1.0 mm. The active carbon was activated in the air at 400° C. for 2 hours, deaerated by boiling in water for one hour, and collected by filtration to obtain wet granular active carbon. Separately, zirconium oxychloride (produced by Kanto Kagaku K.K.) was dissolved in pure water to prepare six zirconium oxychloride solutions of concentrations ranging from 8 to 28% by weight in terms of $ZrO_2$. The above wet granular active carbon was immersed to the respective zirconium oxychloride solutions for 3 hours. The granular active carbon impregnated with zirconium oxychloride was collected by filtration and was dried at 110° C. for 2 hours. The batches of the treated granular active carbon were respectively immersed in an aqueous 1N sodium hydroxide solution for one hour at the pH adjusted to be in the range from 8.0 to 9.0 to form zirconium hydroxide in the granular active carbon. The resulting ion-exchangers were subjected to measurement of sulfate ion adsorption capacity. The measurement was conducted by adding the resulting ion-exchanger in a brine containing 16.2% by weight of sodium chloride, and 0.67% by weight of sodium sulfate, treating the ion-exchanger for one hour with the brine at the pH maintained at 4.0 with an aqueous 1N hydrochloric acid solution, removing the ion-exchanger by filtration, and measuring the sulfate ion concentration in the filtrate by an ion chromatography apparatus (manufactured by Tosoh Corporation; column: TSK-GEL IC-Anion-PW). The amount of the zirconium hydroxide supported on the active carbon was measured by an ICP apparatus (manufactured by Seiko Densi Kogyo K.K.; Model: SPS 7000A). Table 1 shows the amount of the supported zirconium hydroxide, and the sulfate ion adsorption capacity.

As the results, the amount of the zirconium hydroxide supported on the active carbon increased with the increase of the concentration of the zirconium oxychloride as the starting material. The sulfate ion adsorption capacity of the ion-exchanger also increased thereby.

EXAMPLE 2

For supporting a zirconium compound, a commercial granular active carbon (peat as a source material; trade name: Row-0.8S, Norit Co.) was employed which has an iodine absorption number of 1100 mg/g, a pore volume of 1.0 $cm^3/g$, a bulk density of 0.38 g/mL, a specific surface area of >1000 $m^2/g$, and an average particle diameter of 0.8 mm. Separately, zirconium oxychloride was dissolved in pure water to prepare a zirconium oxychloride solution of concentration 19% by weight in terms of $ZrO_2$. The experiment was conducted in the same manner as in Example 1 except that the above active carbo n and the zirconium oxychloride was used, and the impregnation treatment was conducted once or repeated again to obtain two kinds of granular active carbon having zirconium hydroxide. The amount of the supported zirconium hydroxide and the sulfate ion adsorption capacity of the ion-exchangers were measure in the same manner as in Example 1. Table 2 shows the results.

As the results, both the amount of the zirconium hydroxide supported on the active carbon increased by repetition of the impregnation treatment. The sulfate ion adsorption capacity of the ion-exchanger also increased thereby.

EXAMPLE 3

Ion-exchangers comprising zirconium hydroxide supported on granular active carbon were prepared in the same manner as in Example 1 except that the same active carbon as in Example 2 was used and the combination of the pretreatment of the active carbon and drying after the impregnati on of an aqueous zirconium oxychloride solution (9% by weight in terms of $ZrO_2$) was varied. The resulting ion-exchangers were tested in the same manner as in Example 1. Table 3 shows the results.

EXAMPLE 4

Ion-exchangers comprising zirconium hydroxide supported on granular active carbon were prepared in the same manner as in Example 1 except that the active carbon derived as in Example 2 was used and dried at a temperature of 40° C., 110° C., or 180° C. The resulting ion-exchangers were tested in the same manner as in Example 1. Table 4 shows the results.

EXAMPLE 5

Ion-exchangers comprising zirconium hydroxide supported on granular active carbon were prepared in the same manner as in Example 1 except that the same active carbon as in Example 2 was used, zirconium sulfate (produced by Kishida Kagaku K.K.) was impregnated an aqueous zirconium sulfate solution (8.6% by weight in terms of $ZrO_2$) into the active carbon, and the active carbon was dried at a temperature of 110° C., or 180° C. The resulting ion-exchangers were tested in the same manner as in Example 1. Table 5 shows the results.

EXAMPLE 6

Granular active carbon (52 mL, containing 17.6 mmol-Zr) prepared in Example 2 was packed in a jacketed glass column of 40 mm in inside diameter. Hot water at a temperature of 70° C. to 75° C. was allowed to flow through the jecket. A brine containing 16.2% by weight of sodium chloride and 0.67% by weight of sodium sulfate heated to a temperature of 70° C. to 75° C. was circulated through the column with the pH of the brine maintained at a constant level by addition of an aqueous 1N hydrochloric acid solution to adsorb the sulfate ion. The brine was fed to the column at an SV (space velocity) of 335/hr and an LV (linear velocity) of 13.8 m/hr. The adsorption was continued for three hours at the brine pH maintained at 4.0, or for one hour at the brine pH maintained at 3.0. The sulfate ion exchange capacity of the resulting ion-exchanger was measured in the same manner as in Example 1. The sulfate ion exchange capacity was found to be 0.20 mol-$SO_4^{2-}$/mol-Zr at pH 4.0, and 0.27 mol-$SO_4^{2-}$/mol-Zr at pH 3.0.

EXAMPLE 7

For supporting a zirconium compound, a commercial granular active carbon (coal as a source material; trade name: Row-0.8S, Norit Co.) was employed which has an iodine absorption number of 1100 mg/g, a pore volume of 1.0 $cm^3$/g, a bulk density of 0.38 g/mL, a surface area of >1000 $m^2$/g, and an average particle diameter of 0.8 mm. The active carbon was activated in the air at 400° C. for 2 hours, deaerated by boiling in water for one hour, and collected by filtration to obtain wet granular active carbon. Separately, p-TSA (produced by Kanto Kagaku K.K.), disodium m-benzenedisulfonate (produced by Wako Pure Chemical Industries, Ltd.), sodium phenolsulfonate (produced by Wako Pure Chemical Industries, Ltd.), and sodium styrenesulfonate (produced by Tosoh Corporation) were respectively dissolved in pure water to prepare aqueous solutions of a concentration of 0.5–0.6 mole/kg as shown in Table 6. The above wet granular active carbon was added to the respective solutions, and was impregnated with the respective solutions for 3 hours. The active carbon was collected by filtration, and was dried at 80° C. for 3 hours. The batches of granular active carbon carrying the sulfonic acid compound were immersed respectively in an aqueous solution of zirconium oxychloride (produced by Kanto Kagaku K.K.). The granular active carbon impregnated with zirconium oxychloride was separated by filtration and was dried at 80° C. for 3 hours. The batches of the treated granular active carbon were respectively immersed in an aqueous 1N sodium hydroxide solution for one hour at the pH adjusted to be in the range from 8.0 to 9.0 to form zirconium hydroxide in the granular active carbon. The amounts of the supported sulfonic acid compound in the ion-exchanger was measured by an HPLC apparatus (manufactured by Tosoh Corporation, column: TSK-GEL ODS-80Ts). Table 6 shows the results.

EXAMPLE 8

For supporting a zirconium compound, a commercial granular active carbon (coal as a source material; trade name: Row-0.8S, Norit Co.) was employed which has an iodine absorption number of 1100 mg/g, a pore volume of 1.0 $cm^3$/g, a bulk density of 0.38 g/mL, a surface area of >1000 $m^2$/g, and an average particle diameter of 0.8 mm. The active carbon was activated in the air at 400° C. for 2 hours, deaerated by boiling in water for one hour, and collected by filtration to obtain wet granular active carbon. Separately, p-TSA (produced by Kanto Kagaku K.K.) was dissolved in pure water to prepare an aqueous 10% (weight) p-TSA solution. The above wet granular active carbon was added to the solution, and was impregnated with the p-TSA solution for 3 hours. The active carbon after impregnation was collected by filtration, and was dried at 80° C. for 3 hours. The granular active carbon carrying the p-TSA was immersed in an aqueous zirconium oxychloride solution prepared by dissolving zirconium oxychloride (produced by Kanto Kagaku K.K.) in pure water at a concentration of 20% by weight in terms of $ZrO_2$ for 3 hours. The granular active carbon carrying the p-TSA and impregnated with zirconium oxychloride was separated by filtration and was dried at 80° C. for 3 hours. The treated granular active carbon was immersed in an aqueous 1N sodium hydroxide solution for one hour at the pH adjusted to be in the range from 8.0 to 9.0 to form zirconium hydroxide in the granular active carbon. Separately, the granular active carbon was conducted in the same manner as above except that no p-TSA was impregnated. The resulting ion-exchangers were subjected to measurement of sulfate ion adsorption capacity. The measurement was conducted by adding the resulting ion-exchanger in a brine containing 16.2% by weight of sodium chloride, and 0.67% by weight of sodium sulfate, treating the ion-exchanger for one hour with the brine at the pH maintained at 4.0 with an aqueous 1N hydrochloric acid solution , removing the ion-exchanger by filtration, and measuring the sulfate ion concentration in the filtrate by an ion chromatography apparatus (manufactured by Tosoh Corporation; column: TSK-GEL IC-Anion-PW). The amount of the zirconium hydroxide supported on the active carbon was measured by an ICP apparatus (manufactured by Seiko Densi Kogyo K.K.; Model: SPS 7000A). Table 7 shows the amount of the supported p-TSA and the supported zirconium hydroxide, and the sulfate ion adsorption capacity.

As the results, the impregnation of p-TSA was found to increase the sulfate ion adsorption capacity of the ion-exchanger.

EXAMPLE 9

An aqueous solution of p-TSA of 15% by weight was prepared by dissolving p-TSA (produced by Kanto Kagaku K.K.) in pure water. Separately, aqueous solutions of zirconium oxychloride of concentrations of 12% to 24% by weight in terms of $ZrO_2$ was prepared by dissolvi ng zirconium oxychloride (produced by Kanto Kagaku K.K.) in pure water. By use of the same active carb on as in Example 8, ion-exchangers were prepared which comprises zirconium hydroxide and p-TSA supported on the active carbon. The sulfate ion adsorption capacity of the resulting ion-exchanger was measured in the same manner as in Example 8 except that the sulfate ion adsorption reaction was allowed to proceed at pH 3.0. Table 8 shows the results.

From the results, the increase of the concentration of the zirconium oxychloride as the starting material increased the amount of the supported zirconium hydroxide in the ion-exchanger, and the sulfate ion adsorption capacity was sufficiently high for the zirconium in the ion-exchanger.

EXAMPLE 10

Ion-exchangers comprising zirconium hydroxide and p-TSA supported on granular active carbon were prepared in the same manner as in Example 8 with the same active carbon as in Example 8 was used except that the zirconium oxychloride solution had a concentration of 20% by weight in terms of $ZrO_2$, and the amount of the supported p-TSA was varied. The resulting ion-exchangers were tested in the same manner as in Example 8. Table 9 shows the results.

From the results, the increase of p-TSA supported on the active carbon was found to decrease the amount of the zirconium hydrochloride supported in the ion-exchanger.

EXAMPLE 11

A solution of a mixture of zirconium oxychloride and p-TSA was impregnated into active carbon. A solution was prepared by dissolving, in pure water, zirconium oxychloride at a concentration of 13% by weight in terms of $ZrO_2$, and p-TSA at a concentration of 18% by weight. The same active carbon as in Example 8 was immersed into the solution for 3 hours. The granular active carbon impregnated with zirconium oxychloride and p-TSA was collected by filtration, and was dried at 80° C. for 3 hours. The treated granular active carbon was immersed in an aqueous 1N sodium hydroxide solution for one hour at the pH adjusted to be in the range from 8.0 to 9.0 to form zirconium hydroxide in the granular active carbon. The amount of the supported zirconium hydroxide in the ion-exchanger was 0.51 mol/kg-active carbon, and the amount of the supported p-TSA was 0.94 mol/kg-active carbon. The sulfate ion adsorption capacity was found to be 0.29 mol-$SO_4^{2-}$/mol-Zr by the same measurement operation as in Example 8.

EXAMPLE 12

Zirconium hydroxide and p-TSA were impregnated into granular active carbon in the same manner as in Example 8. The granular active carbon (80 mL, containing 22.6 mmol-Zr) was packed in a jacketed glass column of 40 mm in inside diameter. Hot water at a temperature of 70° C. to 75° C. was allowed to flow through the jacket. A brine containing 16.2% by weight of sodium chloride and 0.67% by weight of sodium sulfate heated to a temperature of 70° C. to 75° C. was circulated through the column with the pH of the brine maintained at a constant level by addition of an aqueous 1N hydrochloric acid solution to adsorb the sulfate ion. The brine was fed to the column at an SV (space velocity) of 218/hr and an LV (linear velocity) of 13.8 m/hr. The adsorption was continued for 1.5 hours at the brine pH maintained at 4.0. The sulfate ion exchange capacity of the resulting ion-exchanger was measured in the same manner as in Example 9.

Separately, the adsorption experiment was conducted in the same manner as above except that no p-TSA was impregnated into the granular active carbon and the adsorption was continued for 3 hours.

Table 10 shows the results.

p-TSA deposited on the carrier raised the sulfate ion adsorption velocity to shorten the adsorption reaction time and also increased the amount of adsorption of the sulfate ion.

EXAMPLE 13

Zirconium hydroxide was impregnated into granular active carbon in the same manner as in Example 1 except that the granular active carbon was the commercial one employed in Example 8, the pH adjustment with sodium hydroxide was made to be at 12.0, 13.0 or 14.0, and the concentration of the aqueous zirconium oxychloride was 19% by weight in terms of $ZrO_2$. The amount of zirconium hydroxide contained in the obtained ion-exchanger was measured in the same manner as in Example 1. Table 11 shows the results.

The zirconium hydroxide was supported in a larger amount by the alkali treatment at the pH ranging from 12.0 to 14.0.

EXAMPLE 14

The same granular active carbon as in Example 8 was used as the carrier. The granular active carbon was impregnated with zirconium and p-TSA in the same manner as in Example 8 except that the pH adjustment with sodium hydroxide was made to be at 14. 30 Grams of the granular active carbon was placed in a flask. Thereto, 600 g of brine (containing 16% by weight of NaCl, 0.67% by weight of $Na_2SO_4$, and balance of water) was added as an electrolysis simulation solution. The content of the flask was stirred at 70° C. at pH 2.0 or 3.0 for 3 hours with pH monitoring. The sulfate ion adsorption capacity was measured in the same manner as in Example 1. Table 12 shows the results.

As the results, the sulfate ion adsorption capacity of the zirconium in the active carbon was sufficiently high.

COMPARATIVE EXAMPLE 1

Zirconium oxychloride was dissolved in pure water to prepare an aqueous zirconium oxychloride (7% by weight in terms of $ZrO_2$). An aqueous 20% sodium hydroxide solution was added thereto dropwise in an amount of 2 moles per mole of $ZrO_2$ in 30 minutes. The mixture was stirred at a stirring rate of 300 rpm at room temperature for one hour. The formed gel-like slurry was collected by filtration to obtain a wet zirconium hydroxide aggregate, having an average particle diameter ($D_{50}$) of 9 µm as measured with a microtrac (Model: MKII-SPA, manufactured by Leed & Northrup Co.). The wet zirconium hydroxide aggregate was dried at 40° C. for 20 hours, and pulverized to obtain powdery zirconium hydroxide. This powdery zirconium hydroxide has an average particle diameter ($D_{50}$) of 11 µm. The products were measured for the sulfate ion adsorption capacity in the same manner as in Example 1. Table 13 shows the results.

In comparison of the above results with the results of Examples, the ion exchange capacity of zirconium hydroxide is made significantly larger by impregnation into an active carbon than that of simple zirconium hydroxide.

COMPARATIVE EXAMPLE 2

As the carriers, three commercial adsorbent synthetic resins were used instead of an active carbon: Sepabeads SP-825 and SP-850 produced by Mitsubishi Chemical Co., and Amberlite XAD-7 produced by Japan Organo Co., Ltd.). Ion-exchangers were prepared in the same manner as in Example 1 except that one of the above three commercial molecule-adsorbent synthetic resins was used in place of the active carbon and was impregnated with an aqueous zirconium hydroxide solution having a concentration (% by weight in terms of $ZrO_2$) as shown in Table 15. Table 14 shows the properties of the used resins. The resulting ion-exchangers were subjected to measurement in the same manner as in Example 1. Table 15 shows the results.

In comparison of the above results with the results of Examples, the amount of the zirconium hydroxide supported by active carbon is larger than that supported by the resin as the carrier when the same concentration zirconium compound is used for the impregnation.

EXAMPLE 15

The granular active carbon used in Example 2 was used as the carrier in this Example. "Ion-Exchanger I" was prepared by impregnating zirconium hydroxide into the granular active carbon in the same manner in Example 1. "Ion-Exchanger II" was prepared by impregnating zirconium hydroxide and p-TSA into the granular active carbon in the same manner as in Example 8. 30 Grams each of Ion-Exchanger I, Ion-Exchanger II, and non-impregnated active carbon ("Untreated Active Carbon") were placed respectively in a 3-liter three-neck flask. 600 Grams of brine (containing 16% by weight of NaCl, 0.68% by weight of $Na_2SO_4$, 0.5% by weight by weight of $NaClO_3$, and balance of water) as the electrolysis simulation solution was added to each of the flasks, and the content of the each flask was stirred at 70° C. at pH 2.0. This treatment was continued for 27 days for Ion-Exchanger I, 37 days for Ion-Exchanger II, and 26 days for Untreated Active Carbon. The treated matters were collected by filtration, washed, and dried. The dried matters, and the ones not treated with the brine were tested for mechanical strength. As the results, Ion-Exchanger I and Ion-Exchanger II did not change the mechanical strength through the brine treatment, whereas Untreated Active Carbon decreased its mechanical strength slightly and became brittle.

From this, the ion-exchanger comprising active carbon and zirconium hydroxide supported thereon had high resistance to chemicals such as $NaClO_3$, and had sufficient mechanical strength after the brine treatment in comparison with the simple active carbon as the base material.

EXAMPLE 16

Zirconium hydroxide and p-TSA were impregnated into granular active carbon in the same manner as in Example 8 except that the pH adjustment with sodium hydroxide was made at pH 14.0. The granular active carbon (72.3 mL, containing 46.2 mmol-Zr) was packed in a jacketed glass column of 20 mm in inside diameter. Hot water at a temperature of 70° C. to 75° C. was allowed to flow through the jecket. A brine containing 16.2% by weight of sodium chloride and 0.67% by weight of sodium sulfate heated to a temperature of 70° C. to 75° C. was allowed to pass by a one-pass method or a circulation method through the column with the pH of the brine maintained at 2.0 by addition of an aqueous 1N hydrochloric acid solution. Thus the sulfate ion adsorption was continued for 60 minutes. The brine was fed to the column at an SV (space velocity) of 60/hr. The sulfate ion exchange capacity of the resulting ion-exchanger was 0.63 mol-$SO_4^{2-}$/kg-active carbon for the one pass method, and 0.40 mol-$SO_4^{2-}$/kg-active carbon for the circulation method as measured in the same manner as in Example 1.

The ion-exchanger of the present invention, which comprises zirconium hydroxide supported on active carbon, can be handled remarkably easily in treatment steps in production, and has a large ion exchange capacity and high ion exchange velocity. The ion-exchanger of the present invention can be produced extremely simply at low cost by using commercial porous active carbon, and is useful in various application fields utilizing ion exchange and ion adsorption because of high chemical resistance, high heat resistance, high mechanical strength, and excellent ion exchange characteristics.

TABLE 1

| Solution concentration | Amount of supported zirconium hydroxide (mol-Zr/ | Sulfate ion adsorption capacity[1] | |
|---|---|---|---|
| (% by weight in terms of $ZrO_2$) | kg-active carbon) | $SO_4^{2-}$/Zr (mol/mol) | g-$SO_4^{2-}$/kg-active carbon |
| 8 | 0.32 | 0.19 | 5.8 |
| 12 | 0.46 | 0.16 | 7.1 |
| 16 | 0.56 | 0.15 | 8.1 |
| 20 | 0.54 | 0.17 | 8.8 |
| 24 | 0.94 | 0.14 | 12.6 |
| 28 | 0.90 | 0.13 | 11.2 |

[1]Sulfate ion adsorption capacity at sulfate ion equilibrium concentration of 0.09%

TABLE 2

| | Amount of supported zirconium hydroxide | Sulfate ion adsorption capacity[2] | |
|---|---|---|---|
| Times of impregnation treatment | (mol-Zr/kg-active carbon) | $SO_4^{2-}$/Zr (mol/mol) | g-$SO_4^{2-}$/kg-active carbon |
| Once | 0.54 | 0.21 | 10.9 |
| Twice | 0.83 | 0.18 | 14.3 |

[2]Sulfate ion adsorption capacity at sulfate ion equilibrium concentration of 0.09%

TABLE 3

| Pretreatment of active carbon | | Drying after Impregnation | Amount of supported zirconium hydroxide (mol-Zr/kg- |
|---|---|---|---|
| Activation | Deaeration | (110° C., 2 hrs) | active carbon) |
| Activated | Deaerated | Dried | 0.32 |
| Activated | Deaerated | No | 0.13 |
| No | Deaerated | Dried | 0.31 |
| No | Deaerated | No | 0.13 |
| No | No | Dried | 0.25 |

TABLE 4

| Drying | | Amount of supported zirconium hydroxide | Sulfate ion adsorption capacity[3] |
|---|---|---|---|
| Temperature (° C.) | Time (Hr) | (mol-Zr/kg-active carbon) | $SO_4^{2-}$/Zr (mol/mol) |
| 40 | 15 | 1.12 | 0.12 |
| 110 | 2 | 1.46 | 0.11 |
| 180 | 2 | 1.36 | 0.04 |

[3]Sulfate ion adsorption capacity at sulfate ion equilibrium concentration of 0.09%

TABLE 5

| Drying | | Amount of supported zirconium hydroxide | Sulfate ion adsorption capacity[4] |
|---|---|---|---|
| Temperature (° C.) | Time (Hr) | (mol-Zr/kg-active carbon) | $SO_4^{2-}$/Zr (mol/mol) |
| 110 | 2 | 0.28 | 0.19 |
| 180 | 2 | 0.26 | 0.17 |

[4]Sulfate ion adsorption capacity at sulfate ion equilibrium concentration of 0.09%

TABLE 6

| | Concentration (mol/kg) | Supported amount (mol/kg-active carbon) |
|---|---|---|
| p-Toluenesulfonic acid (p-TSA) | 0.59 | 1.50 |
| Disodium m-benzenesulfonate | 0.55 | 0.49 |
| Sodium phenolsulfonate | 0.56 | 0.93 |
| Sodium styrenesulfonate | 0.58 | 1.24 |

TABLE 7

| Solution concentration (% by weight) | | Supported amount | | Sulfate ion adsorption capacity[5] |
|---|---|---|---|---|
| p-TSA | Zirconium (as $ZrO_2$) | p-TSA (mol/kg-active carbon) | Zirconium hydroxide (ZOH) (mol-Zr/kg-active carbon) | (mol-$SO_4^{2-}$/mol/Zr) |
| 10 | 20 | 0.73 | 0.73 | 0.24 |
| 0 | 20 | 0 | 0.83 | 0.18 |

[5]Sulfate ion adsorption capacity at sulfate ion equilibrium concentration of 0.09%

TABLE 8

| Solution concentration (weight % as $ZrO_2$) | Supported amount | | Sulfate ion adsorption capacity[6] | |
|---|---|---|---|---|
| | p-TSA (mol/kg-active carbon) | Zirconium hydroxide (ZOH) (mol-Zr/kg-active carbon) | (mol-$SO_4^{2-}$/mol/Zr) | (mol-$SO_4^{2-}$/kg-active carbon) |
| 12 | 0.84 | 0.32 | 0.35 | 0.11 |
| 18 | 0.91 | 0.38 | 0.34 | 0.13 |
| 20 | 0.93 | 0.44 | 0.31 | 0.14 |
| 24 | 0.92 | 0.45 | 0.30 | 0.14 |

[6]Sulfate ion adsorption capacity at sulfate ion equilibrium concentration of 0.09%

TABLE 9

| Supported amount | | Supporting ratio of p-TSA/Zr (mol/mol) |
|---|---|---|
| p-TSA (mol/kg-active carbon) | zirconium hydroxide (ZOH) (mol-Zr/kg-active carbon) | |
| 0.23 | 0.75 | 0.31 |
| 0.57 | 0.64 | 0.89 |
| 0.78 | 0.58 | 1.34 |
| 0.93 | 0.44 | 2.11 |

TABLE 10

| p-TSA on ion-exchanger | Supported amount | |
|---|---|---|
| | Reaction time (Hr) | Adsorption capacity[7] (mol-$SO_4^{2-}$/mol-Zr) |
| Supported | 1.5 | 0.28 |
| No | 3.0 | 0.20 |

[7]Sulfate ion adsorption capacity at sulfate ion equilibrium concentration of 0.09%

TABLE 11

| pH | Amount of supported zirconium hydroxide (mol-Zr/kg-active carbon) |
|---|---|
| 12.0 | 0.80 |
| 13.0 | 1.04 |
| 14.0 | 1.43 |

TABLE 12

| pH | Sulfate ion adsorption capacity[8] $SO_4^{2-}$/Zr (mol/mol) |
|---|---|
| 2.0 | 0.33 |
| 3.0 | 0.29 |

[8]Sulfate ion adsorption capacity at sulfate ion equilibrium concentration of 0.09%

TABLE 13

| Ion-exchanger | Sulfate ion adsorption capacity[9] $SO_4^{2-}$/Zr (mol/mol) |
|---|---|
| Wet simple zirconium hydroxide | 0.13 |
| Dry simple zirconium hydroxide | 0.06 |

[9]Sulfate ion adsorption capacity at sulfate ion equilibrium concentration of 0.09%

TABLE 14

| | SP-825 | SP-850 | XAD-7 |
|---|---|---|---|
| Specific surface area (m$^2$/g) | 1000 | 1000 | 350–500 |
| Average pore diameter (Å) | 57 | 38 | 90 |
| Pore volume (mL/g) | 1.4 | 1.2 | 1.14 |
| Base resin | Styrene-divinylbenzene | Styrene-divinylbenzene | Acrylate ester |

TABLE 15

| Carrier | Solution concentration (weight % as $ZrO_2$) | Amount of supported zirconium hydroxide (mol-Zr/kg-active carbon) | Sulfate ion adsorption capacity[10] $SO_4^{2-}$/Zr (mol/mol) |
|---|---|---|---|
| SP-825 | 9.7 | 0.06 | 0.21 |
| SP-850 | 10.0 | 0.07 | 0.21 |
| XAD-7 | 9.5 | 0.18 | 0.19 |

[10]Sulfate ion adsorption capacity at sulfate ion equilibrium concentration of 0.09%

What is claimed is:

1. An ion-exchanger comprising zirconium hydroxide supported on active carbon, wherein the active carbon has a pore volume ranging from 0.5 to 1.4 cm$^3$/g and a specific surface area ranging from 700 to 1600 m$^2$/g, wherein the active carbon is granular, and wherein a sulfonic acid compound is supported on the active carbon in addition to the zirconium hydroxide.

2. A process for removing a multiply charged anion in an aqueous solution or organic solvent, comprising contact of the aqueous solution or organic solvent containing the multiply charged anion with the ion-exchanger set forth in claim 1.

3. The process for removing a multiply charged anion according to claim 2, wherein the solution containing the multiply charged anion is brine containing sulfate ion.

4. The process for removing a multiply charged anion according to claim 2 or 3, wherein the solution containing the multiply charged anion is passed through a packed column filled with the ion-exchanger.

5. The process for removing a multiply charged anion according to claim 4, wherein the removal is conducted at a pH ranging from 1.5 to 5.0 of the solution containing the multiply charged anion before passage to the ion-exchanger.

6. The ion-exchanger according to claim 1, wherein the sulfonic acid compound is selected from the group consisting of o-toluene sulfonic acid, m-toluene sulfonic acid, p-toluene sulfonic acid, o-styrene sulfonic acid, m-styrene sulfonic acid, p-styrene sulfonic acid, o-benzene sulfonic acid, m-benzene sulfonic acid, p-benzene sulfonic acid, o-phenol sulfonic acid, m-phenol sulfonic acid, p-phenol sulfonic acid, o-dodecylbenzene sulfonic acid, m-dodecylbenzene sulfonic acid, p-dodecylbenzene sulfonic acid, o-benzene disulfonic acid, m-benzene disulfonic acid, p-benzene disulfonic acid, chloroethane sulfonic acid, pentane sulfonic acid, and alkali metal or alkaline earth metal salts thereof.

7. The ion-exchanger according to claim 1, wherein the sulfonic acid compound is selected from the group consisting of o-toluene sulfonic acid, sulfonic acid, m-toluene sulfonic acid, p-toluene sulfonic acid, o-benzene sulfonic acid, m-benzene sulfonic acid, p-benzene sulfonic acid, o-phenol sulfonic acid, m-phenol sulfonic acid, p-phenol sulfonic acid, o-styrene sulfonic acid, m-styrene sulfonic acid, p-styrene sulfonic acid, and alkali metal or alkaline earth metal salts thereof.

8. The ion-exchanger according to claim 1, wherein the sulfonic acid compound is p-toluene sulfonic acid or an alkali metal or alkaline earth metal salt thereof.

9. A process for producing an ion-exchanger as set forth in claim 1, wherein the active carbon is first impregnated with a sulfonic acid compound solution and then with a zirconium compound solution whereafter the impregnated active carbon is brought into contact with an alkali.

10. The process of claim 9 wherein said impregnated active carbon is dried before contact with the alkali when the zirconium compound and the sulfonic acid compound are supported on the active carbon.

11. The process for producing the ion-exchanger according to claim 9 or 10, wherein the zirconium compound solution and the sulfonic acid compound solution are an aqueous solution.

12. The process of claim 9 wherein said impregnated active carbon is dried after contact with the alkali when the zirconium compound and the sulfonic acid compound are supported on the active carbon.

13. A process for producing an ion-exchanger as set forth in claim 1, wherein the active carbon is simultaneously impregnated with a sulfonic acid solution and a zirconium compound solution and thereafter the thus impregnated carbon is brought into contact with an alkali.

14. The process of claim 13 wherein said impregnated active carbon is dried before contact with the alkali when the zirconium compound and the sulfonic acid compound are supported on the active carbon.

15. The process of claim 13 wherein said impregnated active carbon is dried after contact with the alkali when the zirconium compound and the sulfonic acid compound are supported on the active carbon.

* * * * *